(12) United States Patent
Maienschein (10) Patent No.: US 10,203,020 B2
(45) Date of Patent: Feb. 12, 2019

(54) CENTRIFUGAL PENDULUM

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 87 days.

(21) Appl. No.: 14/648,786

(22) PCT Filed: Nov. 29, 2013

(86) PCT No.: PCT/DE2013/200328
§ 371 (c)(1),
(2) Date: Jun. 1, 2015

(87) PCT Pub. No.: WO2014/114280
PCT Pub. Date: Jul. 31, 2014

(65) Prior Publication Data
US 2015/0316125 A1 Nov. 5, 2015

(30) Foreign Application Priority Data

Dec. 20, 2012 (DE) .................. 10 2012 223 955
Jul. 30, 2013 (DE) .................. 10 2013 214 808

(51) Int. Cl.
*F16F 15/14* (2006.01)
*F16F 15/139* (2006.01)
*F16F 15/129* (2006.01)

(52) U.S. Cl.
CPC ........ *F16F 15/145* (2013.01); *F16F 15/1292* (2013.01); *F16F 15/1397* (2013.01); *Y10T 74/2128* (2015.01)

(58) Field of Classification Search
CPC ....... F16F 15/1397; F16F 15/145; F16D 3/12; F16D 7/02; F16D 7/024; F16D 7/021; F16D 7/028; F16B 21/18
See application file for complete search history.

(56) References Cited

U.S. PATENT DOCUMENTS

| 5,560,267 | A | 10/1996 | Todd et al. |
| 8,490,766 | B2 * | 7/2013 | Maienschein ......... F16F 15/145 192/3.29 |
| 2002/0062713 | A1 | 5/2002 | Feldhuas et al. |
| 2013/0150169 | A1 | 6/2013 | Krause et al. |

FOREIGN PATENT DOCUMENTS

| CN | 1603654 | 4/2005 |
| CN | 1955502 | 5/2007 |
| DE | 10005548 | 8/2001 |
| DE | 102006028552 | 5/2007 |

(Continued)

*Primary Examiner* — Thomas C Diaz
(74) *Attorney, Agent, or Firm* — Brooks Kushman P.C.

(57) ABSTRACT

A centrifugal pendulum, including a rotation element and a pendulum flange. The pendulum flange is connected to the rotation element by means of a fastening means to transmit torque between the rotation element and the pendulum flange. The fastening means is designed in such a way that for the torque greater than a certain amount, some slip, or relative rotation, occurs between the pendulum flange and the rotation element.

17 Claims, 7 Drawing Sheets

(56) References Cited

FOREIGN PATENT DOCUMENTS

| DE | 102006054407 | | 5/2008 | |
|---|---|---|---|---|
| DE | 102010054297 | | 6/2011 | |
| DE | 102011013232 | | 9/2011 | |
| DE | 102011101137 | | 2/2012 | |
| DE | 102011087631 A1 * | 6/2012 | ............ F16F 15/145 |
| DE | 102012219965 A1 * | 5/2013 | ........ F16F 15/12353 |
| EP | 1780434 A2 * | 5/2007 | ............ F16D 13/58 |
| GB | 728825 A * | 4/1955 | ............ F16B 21/18 |

* cited by examiner

CENTRIFUGAL PENDULUM

CROSS-REFERENCE TO RELATED APPLICATIONS

The present application is the U.S. national stage application pursuant to 35 U.S.C. § 371 of International Application No. PCT/DE2013/200328, filed Nov. 29, 2013, which application claims priority of German Application No. 10 2012 223 955.3, filed Dec. 20, 2012 and German Application No. 10 2013 214 808.9, filed Jul. 30, 2013.

TECHNICAL FIELD

The present disclosure relates to a centrifugal pendulum including a rotation element and a pendulum flange, which is connected to the rotation element by means of a fastening means to transmit torque between the rotation element and the pendulum flange.

BACKGROUND

German Patent Application No. 10 2011 013 232 A1 discloses a centrifugal pendulum including a pendulum flange and pendulum masses arranged on both sides of the pendulum flange. The pendulum masses are connected to one another by means of a spacer bolt received in an arcuate section of the pendulum flange. Furthermore, the hub is supported for rotation about an axis of rotation and the pendulum flange is connected to the hub by means of a cold-rivet connection so as to be fixed against rotation relative to the hub. In shifting operations, excess torque may be introduced into the pendulum flange via the rivet connection, causing the pendulum masses to hit stops and creating noise that reduces the acoustic comfort. Moreover, the impact may shorten the useful life of the centrifugal pendulum.

SUMMARY

An object of the present disclosure is to provide a low-noise centrifugal pendulum.

In accordance with the present disclosure, a low-noise centrifugal pendulum includes a rotation element and a pendulum flange, where the pendulum flange is connected to the rotation element by means of a fastening means to transmit torque between the rotation element and the pendulum flange, where the fastening means is designed in such a way that the transmission of torque between the pendulum flange and the rotation element is at least partly achieved by a non-positive or force-locking connection. By a "non-positive or force-locking connection" we mean that for torque greater than a certain amount, some slip, or relative rotation, occurs between the pendulum flange and the rotation element. In an example embodiment, the pendulum flange surrounds the rotation element.

An advantage of this design is that when torque peaks occur during a shifting operation, for instance, the pendulum flange may rotate relative to the hub to prevent the peak torque from being transmitted to the pendulum masses. This is a simple way of reducing the impulse introduced into the pendulum masses, effectively preventing any impact. Preventing the impact of the pendulum masses eliminates the noise of the impact. As a result, a low-noise centrifugal pendulum is provided.

In accordance with an example embodiment, the fastening means includes a tensioning means, a first fastening section disposed on the rotation element, a second fastening section disposed on the rotation element to be spaced apart from the first fastening section along an axis of rotation of the rotation element, where the first fastening section is assigned to a first end face of the pendulum flange, where the tensioning means is disposed between the second fastening section and a second end face of the pendulum flange, the second end face disposed opposite the first end face, and where the tensioning means is designed to press the pendulum flange in the direction of the first fastening section. In this way, torque may easily be transmitted between the hub and the pendulum flange via the first fastening section and the pendulum flange. Furthermore the pendulum flange may slip on the hub during peak torques, effectively limiting the impulse introduced into the pendulum masses.

In accordance with an example embodiment, the first fastening section and/or the second fastening section have a circumferential groove or the first fastening section has a protrusion and the second fastening section has a circumferential groove. In this way, the fastening sections may easily and inexpensively be formed on the hub, for instance in a machining process, in particular a turning process.

In accordance with an advantageous aspect, the protrusion may include a first contact surface facing the first end face of the pendulum flange and the tensioning means may press the pendulum flange against the first contact surface.

In accordance with an advantageous aspect, a first securing ring circumferentially surrounding the rotation element and engaging in the first fastening section may be provided, the first securing ring having a first contact surface facing the first end face of the pendulum flange, where the tensioning means press the pendulum flange against the first contact surface. In this way, a transmission of torque between the hub, the first securing ring, and the pendulum flange may be reliably ensured.

In accordance with an example embodiment, the tensioning means includes at least a second securing ring engaging in the second fastening section and designed to introduce a tensioning force of the tensioning means into the rotation element, the tensioning force being effective in a direction parallel to the axis of rotation. In this way, the pendulum flange may especially inexpensively and quickly be connected to the hub during the manufacturing of the centrifugal pendulum.

In accordance with an example embodiment, the second securing ring has an end-face side second contact surface facing the second end face of the pendulum flange, where on the end face facing away from the pendulum flange, the second securing ring has a first incline and is designed to provide a radial pre-loading force to press the first incline against the second fastening section in such a way that the securing ring provides the tensioning force that extends in a direction parallel to the axis of rotation and introduces the tensioning force into the second end face of the pendulum flange via the second contact surface. In this embodiment, the tensioning means for fastening the pendulum flange to the rotation element is particularly slim in an axial direction and has a particularly low total weight.

In accordance with an example embodiment, the tensioning means includes at least one spring element disposed between the first fastening section and the second securing ring and, for example, embodied as a diaphragm spring or a ring spring or a coil spring, where the spring element, for example, at least partly surrounds the rotation element in a circumferential direction. In this way, a particularly high tensioning force may be provided, allowing a particularly high torque to be transmitted between the pendulum flange and the hub.

In accordance with an example embodiment, the protrusion includes a third incline and the pendulum flange has a fourth incline designed to correspond to the third incline, the fourth incline being pressed against the third incline by the tensioning means. In this way, the pendulum flange may be centered on the hub, providing easy alignment of the pendulum flange relative to the hub during manufacturing and thus avoiding imbalances.

A high torque may be transmitted between the pendulum flange and the rotation element when a pawl device is provided at least partly to transmit torque between the pendulum flange and the rotation element, where the pawl device includes at least a receiving element and an engagement element engaging in the receiving element and where the pawl device, for example, is fixed to the pendulum flange by the fastening means.

The invention will be explained in more detail below based on the drawings, in which identical components are designated by identical reference symbols.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

Figure 1:
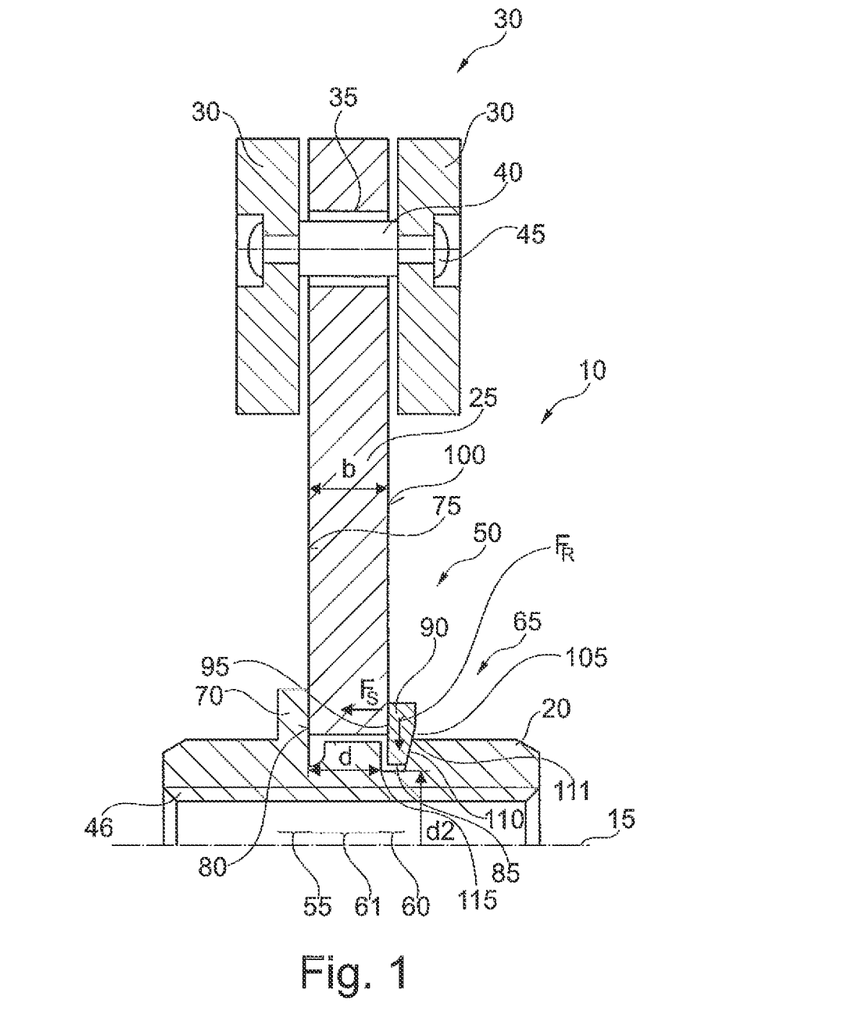
FIG. 1 is a diagrammatic sectional view of a first example embodiment of a centrifugal pendulum.

FIG. 1 is a diagrammatic sectional view of a first example embodiment of centrifugal pendulum 10. Centrifugal pendulum 10 is disposed for rotation about axis of rotation 15 and includes shaft 20 as a rotation element and pendulum flange 25. Pendulum mass pair 30 is provided on both sides of pendulum flange 25. Pendulum flange 25 includes section 35 through which spacer bolt 40 passes to connect both pendulum masses 30 to one another by means of rivet connection 45. Shaft 20 as the rotation element has an interior toothing 46 for connecting shaft 20 to further components of a drive train, for example, to a torsional vibration damper, friction clutch, or transmission shaft. Pendulum flange 25 circumferentially surrounds shaft 20 and is connected to shaft 20 by means of fastening means 50 so as to be fixed against rotation relative to shaft 20, ensuring the transmission of torque between shaft 20 and pendulum flange 25. The transmission of torque between shaft 20 and pendulum flange 25 is achieved in a non-positive, force-locking way by fastening means 50. Alternatively, it is possible to arrange centrifugal pendulum 10 on a torsional vibration damper or on another component of a drive train.

Fastening means 50 includes fastening section 55 arranged to the left of pendulum flange 25 on shaft 20. Fastening means 50 includes fastening section 60 disposed essentially to the right of pendulum flange 25 on shaft 20. Intermediate section 61, whose length essentially corresponds to the axial extension of pendulum flange 25, and which is completely surrounded by the latter in a circumferential direction, is provided between fastening sections 55, 60. Tensioning means 65, designed to provide tensioning force $F_S$ parallel to axis of rotation 15, is provided in fastening section 60.

Fastening section 55 includes protrusion 70 whose diameter is greater than the diameter of shaft 20 in intermediate section 61. Protrusion 70 includes contact surface 75 facing left-hand side end face 80 of pendulum flange 25.

Fastening section 60 is embodied as groove 85 with rectangular trapezoidal shape in shaft 20, with the rectangle of the trapezoidal shape formed on side surface 86 of groove 85, the side surface 86 facing pendulum flange 25. Tensioning means 65 comprises securing ring 90 engaging in groove 85. Securing ring 90 includes contact surface 95 facing pendulum flange 25 and resting against end face 100 of pendulum flange 25, end face 100 disposed on the right-hand side.

Intermediate section 61 has an axial extension d between contact surface 75 of protrusion 70 and side surface 86 of groove 85. Axial extension d is smaller than axial extension b of pendulum flange 25, so that circumferentially, groove 85 is partly covered by pendulum flange 25.

On an end face facing away from end face 100, securing ring 90 has incline 105. Incline 105 is oriented at an angle relative to axis of rotation 15 of centrifugal pendulum 10 and at an angle relative to end face 100 of pendulum flange 25. Contact surface 75, end faces 80, 100, and contact surface 90 are aligned at right angles relative to axis of rotation 15, or, in other words, axis of rotation 15 forms a normal vector of contact surface 75 of protrusion 70, for both end faces 80, 100 of pendulum flange 25, and for contact surface 95 of securing ring 90. Groove 85 further comprises incline 110 on side surface 111 disposed opposite side surface 86. Incline 110 is oriented to correspond to inclination 105 of securing ring 90, so that in an assembled state of securing ring 90, essentially the entire area of inclines 105, 110 are located in groove 85. Due to inclines 105, 110, groove 85 and securing ring 90, respectively, are axially smaller on the inside than on the outside as viewed in a radial direction.

In a relaxed state, the diameter of securing ring 90 is advantageously smaller than interior diameter $d_2$ of groove 85, which means that securing ring 90 is always tensioned in groove 85 to ensure that securing ring 90 is securely fitted in groove 85. Before securing ring 90 is mounted, pendulum flange 25 is slid onto shaft 20 until end face 80 rests against contact surface 75 of protrusion 70. Afterwards, securing ring 90 is mounted. To insert securing ring 90 into groove 85, securing ring 90 is widened by means of non-illustrated lugs and a non-illustrated tool and slid onto shaft 20 in a tensioned state axially on the right-hand side. When securing ring 90 is in the region of groove 85, the tool is removed from the lugs to allow securing ring 90 to relax, i.e. to contract and reduce its diameter in such a way that incline 105 comes to rest against incline 110. Furthermore, contact surface 95 is pressed against end face 100 of pendulum flange 25, axially displacing pendulum flange 25 in the direction of protrusion 70 up until end face 80 of pendulum flange 25 rests against contact surface 75 of protrusion 70.

As pendulum flange 25 is being moved, securing ring 90 is received further in groove 85. Once contact surfaces 75, 95 rest against end faces 80, 100, radial force $F_R$ is partly transformed into tensioning force $F_S$ by inclines 105, 110. Securing ring 90 introduces tensioning force $F_S$ into pendulum flange 25 via contact surface 95 and end face 100. Furthermore, end face 80 of pendulum flange 25 is pressed against contact surface 75 of protrusion 70 and protrusion 70 provides a counterforce so that pendulum flange 25 is tensioned thereon due to tensioning force $F_S$.

When a fluctuating torque is introduced into shaft 20 via interior toothing 20, for instance from a combustion engine, this torque is transmitted to pendulum flange 25 via contact surface 75 and end face 80, respectively, on protrusion 70 as well as via inclines 105, 110 that rest against each other, and via contact surface 95 and end face 100. Pendulum masses 30 act to reduce the fluctuating torque and dampen the vibration, respectively, in a known way.

Depending on the static friction coefficient between contact surfaces 75, 96 and end faces 80, 100 as well as between contact surfaces 105, 110, the maximum torque transmittable between shaft 20 and pendulum flange 25 is determined by tensioning force $F_S$. If the maximum transmittable torque is exceeded for instance due to peak torques that may occur during shifting operations and during the start-up of a combustion engine, shaft 20 will temporarily slip relative to pendulum flange 25, transitioning to dynamic friction. As a result, the maximum torque transmittable based on the dynamic friction continues to be transmitted to pendulum flange 25 and the function of pendulum masses 30 is maintained. Torque peaks that exceed the maximum transmittable torque, however, are not transmitted to pendulum flange 30, avoiding any temporary excess acceleration of pendulum masses 30 and preventing pendulum masses 30 and spacer bolts 40, respectively, from hitting recess 35. As a result, noise caused by the impact of spacer bolt 40 on sections 35 of centrifugal pendulum 10 may be reliably avoided, resulting in a much more silent operation of centrifugal pendulum 10 compared to a conventional centrifugal pendulums.

A further advantage of the embodiment shown in FIG. 1 is that pendulum flange 25 may easily be fastened to shaft 20. No complex riveting process is necessary to connect pendulum flange 25 to protrusion 70 and to shaft 20, respectively. In addition, the illustrated fastening means 50 is more advantageous in terms of weight compared to a rivet connection, resulting in a reduction of the total weight of the centrifugal pendulum while the damping effect remains the same.

Figure 2:
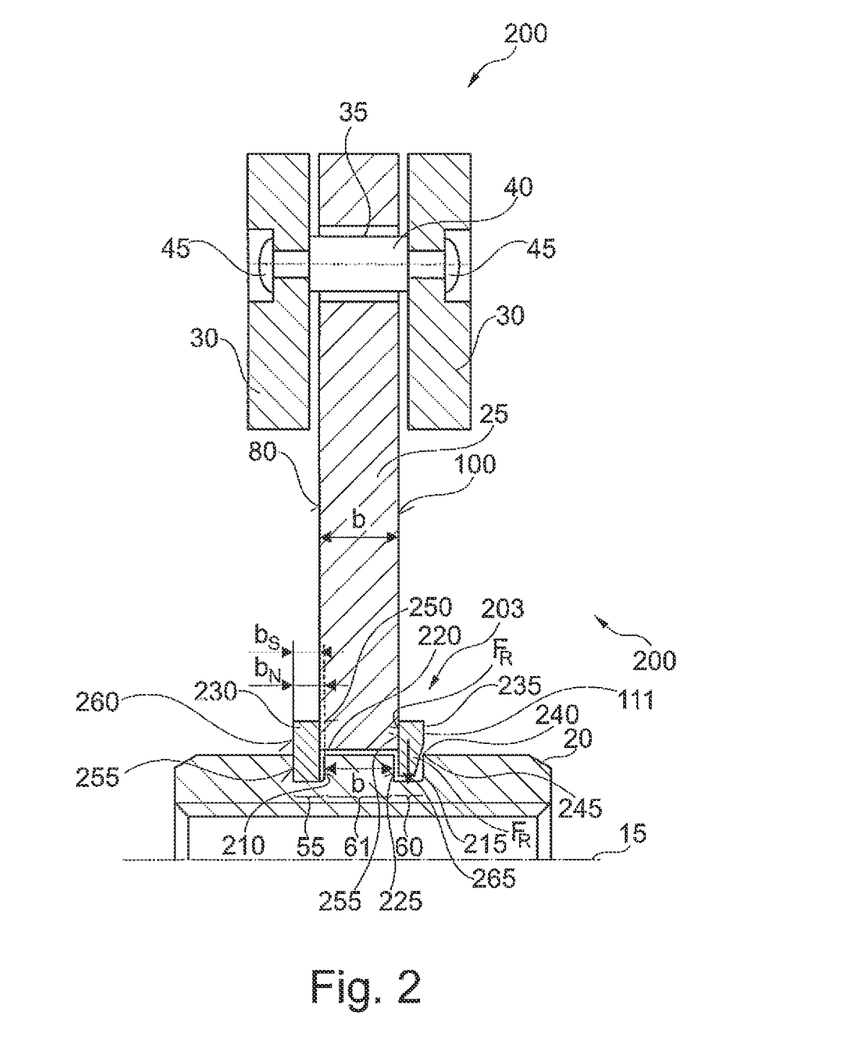
FIG. 2 is a diagrammatic sectional view of a second example embodiment of a centrifugal pendulum.

FIG. 2 is a diagrammatic sectional view of a second embodiment of centrifugal pendulum 200. In a radially outward direction starting from pendulum flange 25, centrifugal pendulum 200 is identical with the centrifugal pendulum shown in FIG. 1. Fastening means 205 fixes pendulum flange 25 to shaft 20. Fastening means 205 comprises groove 210 in fastening section 55 and groove 215 in fastening section 60. Although grooves 210, 215 are shown to be of identical design in terms of their circumferential extension in shaft 20, their designs may be different from one another.

As explained with reference to FIG. 1, intermediate section 61 is disposed between the two fastening sections. Axial extension d of intermediate section 61 between left-hand groove surface 220 of groove 210 and groove surface 225 of groove 215, with groove surface 220 facing end face 80 and groove surface 225 facing end face of pendulum flange 25, is smaller than axial extension b of pendulum flange 25. Both grooves 210, 215 have a rectangular cross-section. Groove 215 further includes groove surface 260 facing away from end face 80 and disposed opposite groove surface 220. In an analogous way, groove 215 has groove surface 265 facing away from end face 100 and disposed opposite groove surface 225.

Securing ring 230 engages in groove 210. Securing ring 230 has a rectangular cross-section. Securing ring 235 engages in groove 215. The axial length $b_S$ of securing rings 230, 235 is smaller than width $b_N$ of groove 210, 215, which means that securing ring 230 is axially movable in groove 210. Securing ring 235 is designed like securing ring shown in FIG. 1 and has incline 240 disposed on end face 111 of securing ring 235, with end face 111 disposed opposite end face 100 of pendulum flange 25.

Securing ring 230 and securing ring 235 are designed to be preloaded for assembling purposes and to provide radial force $F_R$. Radial force $F_R$ causes securing ring 230 to be reliably retained in groove 230.

Due to radial force $F_R$, incline 240 of securing ring 235 rests on groove edge 245 on groove surface 265 of groove 215. As explained with reference to FIG. 1, incline 240 causes radial force $F_R$ to be partly converted into tensioning force $F_S$ via incline 240 and groove edge 245, with tensioning force $F_S$ parallel to axis of rotation 15. As a result, securing ring 235 presses left-hand end face 80 of pendulum flange 25 against contact surface 250 of securing ring 230 via contact surface 255 and end face 100. The non-converted portion of radial force $F_R$ ensures a secure fit of securing ring 235 in groove 215.

Tensioning force $F_S$ causes pendulum flange 25 and securing ring 230 to be displaced axially to the left until contact surface 256 provided on securing ring 230 opposite contact surface 250 rests against groove surface 260. During the axial displacement, securing ring 235 continues to contract and engages farther into groove 215. When contact surface 260 rests against groove surface 256, contact surface 250 rests against end face 80 and end face 100 rests against contact surface 255, securing ring 235 locks pendulum flange 25 on securing ring 230 so that torque coming from shaft 20 may non-positively be transmitted to pendulum flange 25 via fastening means 205, securing rings 230, 235 and grooves 210, 215. This causes torque to be transmitted between shaft 20 into contact surface 256 via groove surface 260 of groove 210 and to be introduced from securing ring 230 into end face 80 into pendulum flange 25 via contact surface 245. The torque is furthermore transmitted to end face 100 of pendulum flange 25 via securing ring 235, groove edge 245 engaged with incline 240 and further via securing ring 235 and contact surface 255. The same path may be used in an opposite order to transmit torque back from pendulum flange 25 into shaft 20 to dampen vibration caused by torque fluctuations.

An advantage of the embodiment shown in FIG. 2 is that shaft 20 is particularly easy to manufacture in a turning process without any material removal. Moreover, securing rings 230, 235 are easy and inexpensive to mount in order to assemble centrifugal pendulum 200.

Figure 3:
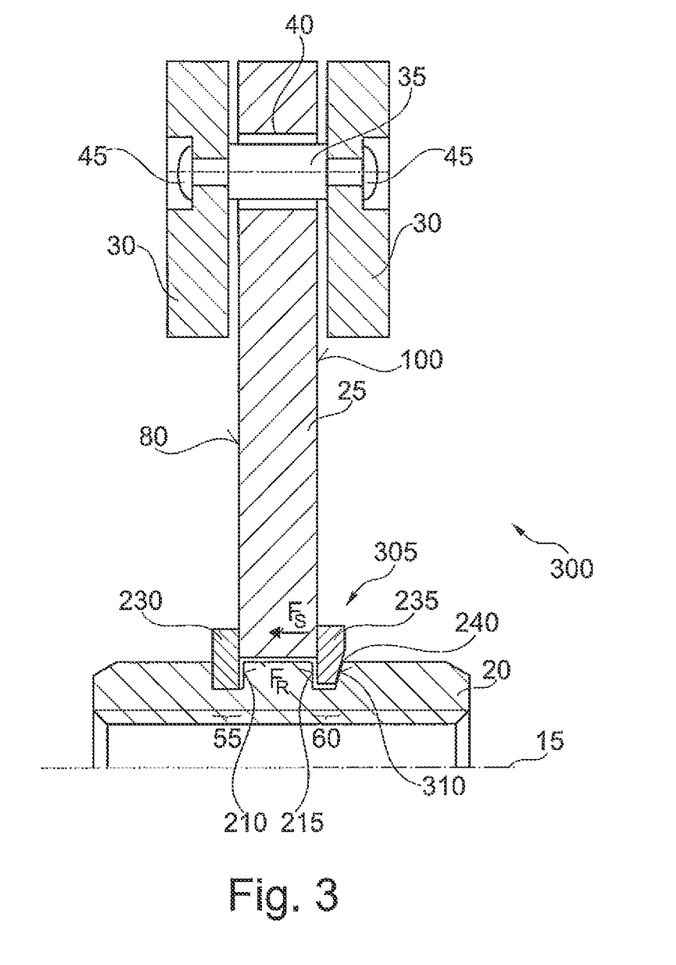
FIG. 3 is a diagrammatic sectional view of a third example embodiment of a centrifugal pendulum.

FIG. 3 is a diagrammatic sectional view of a third embodiment of centrifugal pendulum 300. Starting from pendulum flange 25 in a radially outward direction, the centrifugal pendulum is of the same design as the centrifugal pendulum shown in FIGS. 1 and 2.

Shaft 20 as the rotation element is fixed to pendulum flange 25 by fastening means 305 in a non-positive way to allow the transmission of torque between shaft 20 and pendulum flange 25. Fastening means 305 is essentially identical with the fastening means shown in FIG. 2. However, in addition to the construction shown in FIG. 2, groove 215 has further incline 310 embodied to correspond to incline 240. An additional advantage of this design is that torque may additionally be transmitted from shaft 20 to pendulum flange 25 via inclines 240, 310 of securing ring 235 and groove 215, respectively, the inclines 240, 310 resting against each other. This features avoids plastic deformation of groove edge 245 shown in FIG. 2 by the radial force $F_R$ and/or friction processes on groove edge 245 of securing ring 235.

Figure 4:
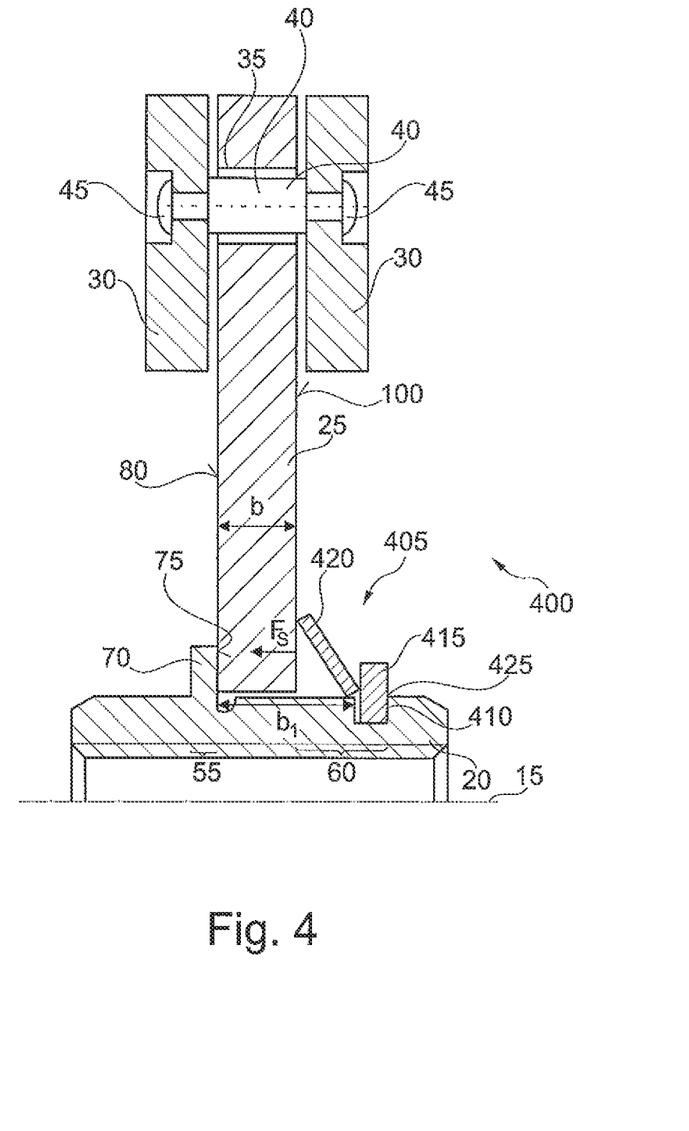
FIG. 4 is a diagrammatic sectional view of a fourth example embodiment of a centrifugal pendulum.

FIG. 4 is a diagrammatic sectional view of a fourth embodiment of centrifugal pendulum 400. In a radially outward direction on pendulum flange 25, centrifugal pendulum 400 is embodied to be identical with the centrifugal pendulums shown in the previous figures.

Pendulum flange 25 is connected to shaft 20 so as to be fixed against relative rotation by means of fastening means 405. Fastening section 55 is identical with the embodiment of the fastening means shown in FIG. 1 and includes protrusion 70. On the right-hand side, groove 410 is provided in fastening section 60. Like in the embodiment of FIG. 2, securing ring 415 is disposed in groove 410. Securing ring 415 is provided with radial force $F_R$ to ensure that securing ring 415 is securely fixed in groove 410. In an axial direction, i.e. in the direction of axis of rotation 15, groove 410 is spaced apart from end face 100 of pendulum flange 25. In addition, disc-like spring element 420 is provided between groove 410 and end face 100. Radially inward, spring element 420 is supported on securing ring 415. Radially outward, spring element 420 is supported on end face 100. Spring element 420 is designed to provide the tensioning force $F_S$ to allow the transmission of torque between shaft 20 and pendulum flange 25 via contact surface 75 of protrusion 70 and end face 80 of pendulum flange 25 by a non-positive connection. The distance between contact surface 75 of protrusion 70 and groove 410 is greater than axial extension b of pendulum flange 25. Axial extension b of pendulum flange 25 is not the only defining factor of the distance; the distance also depends on the installation space of spring element 420 in the tensioned condition to provide tensioning force $F_S$. The tensioning of spring element 420 causes securing ring 415 to be pressed against groove surface 425 in the direction of axis of rotation 15 at the right time to support tensioning force $F_S$ generated by spring element 420 into shaft 20.

Figure 5:
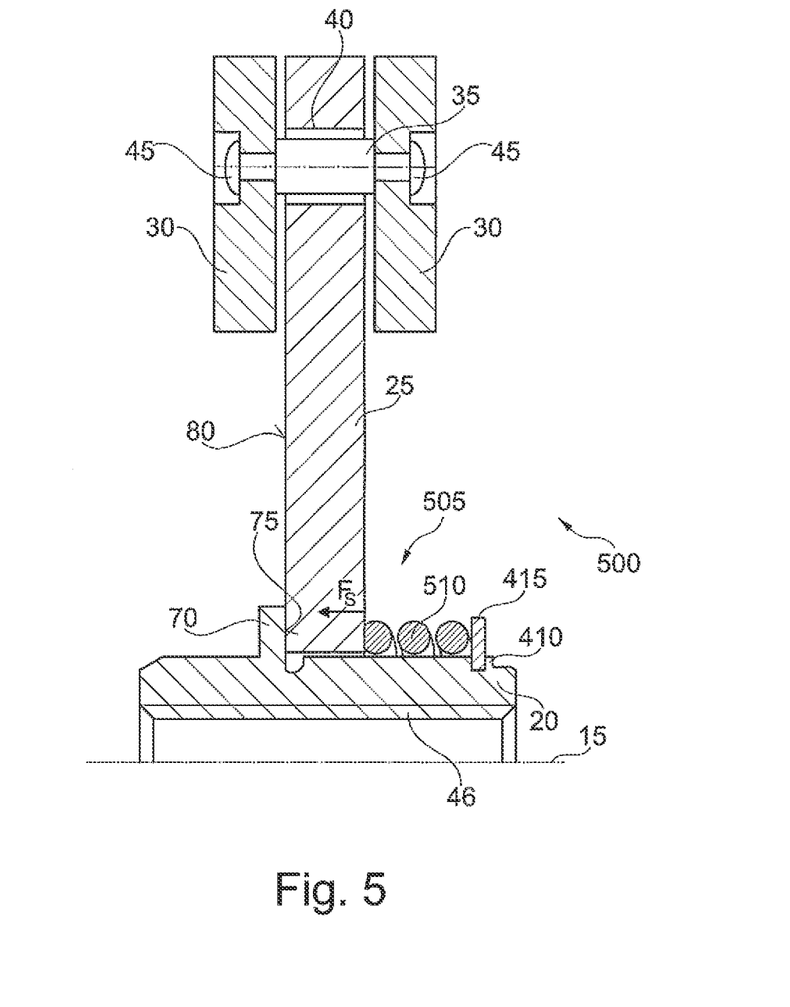
FIG. 5 is a diagrammatic sectional view of a fifth example embodiment of a centrifugal pendulum.

FIG. 5 is a diagrammatic sectional view of a fifth embodiment of centrifugal pendulum 500. In a radially outward direction starting from pendulum flange 25, centrifugal pendulum 500 is embodied to be identical with the centrifugal pendulums shown in the previous figures.

Pendulum flange 25 is fixed to shaft 20 so as to be fixed against relative rotation in a non-positive way by fastening means 505. Fastening means 505 corresponds to the fastening means shown in FIG. 4. However, instead of the disc-shaped spring element shown in FIG. 4, fastening means 505 includes coil-like spring element 510 wound around shaft 20 multiple times. As explained with reference to FIG. 4, spring element 510 likewise generates an axial tensioning force $F_S$ that causes end face 80 of pendulum flange 25 to be pressed against contact surface 75 of protrusion 70 in order to transmit torque introduced into shaft 20 between shaft 20 and pendulum flange 25 in a non-positive way. Like in FIG. 4, spring element 510 is supported via securing ring 415 in groove 410.

Figure 6:
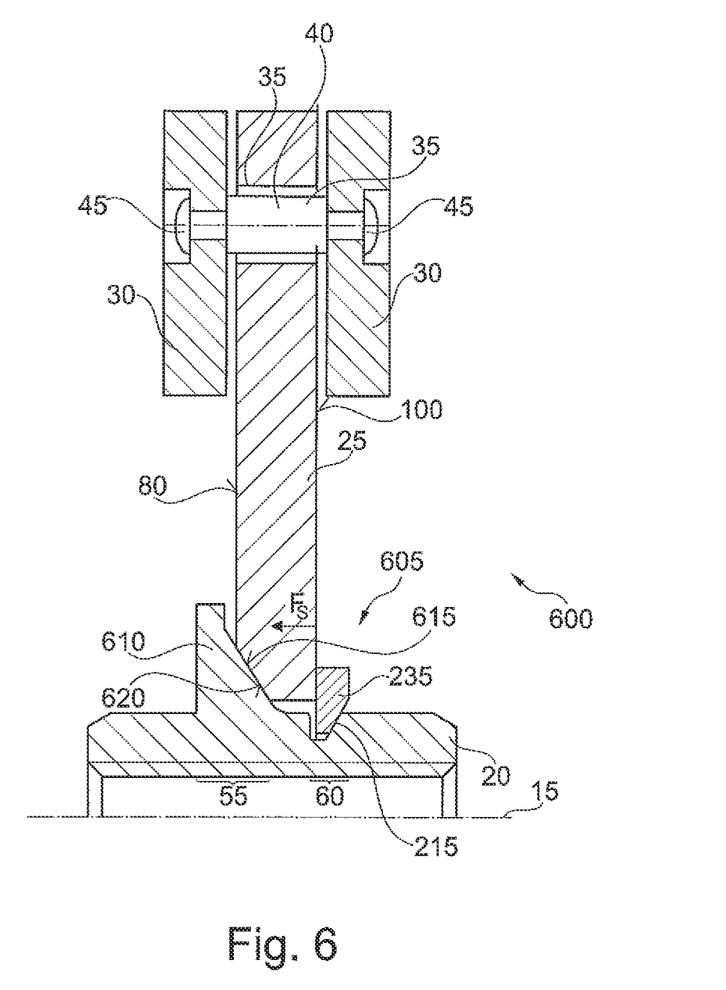
FIG. 6 is a diagrammatic sectional view of a sixth example embodiment of a centrifugal pendulum.

FIG. 6 is a diagrammatic sectional view of a sixth embodiment of centrifugal pendulum 600. In a radially outward direction starting from pendulum flange 25, centrifugal pendulum 600 is embodied to be identical with the centrifugal pendulums shown in the previous figures.

Pendulum flange 25 is connected to shaft 20 by fastening means 605. In fastening section 55, shaft 20 includes protrusion 610, which is radially wider than the protrusion shown in FIG. 1. An inclined contact surface 615 is provided on protrusion 610. Contact surface 615 rests against inclined contact surface 620 of pendulum flange 25 in the region of end face 80. Inclined contact surface 620 is disposed in a way corresponding to contact surface 615. Axial tensioning force $F_S$ is provided by means of securing ring 235 and groove 215, which have already been explained with reference to FIGS. 2 and 3, so that pendulum flange 25 is pressed towards the left onto protrusion 610, and contact surface 620 of pendulum flange 25 is pressed against contact surface 615, allowing torque to be transmitted in a non-positive way between shaft 20 and pendulum flange 25 via contact surfaces 615, 620 and via groove 215, securing ring 235, and end face 100. Due to the fact that protrusion 610 has incline 615, pendulum flange 25 may easily be centered on shaft 20 during manufacturing/assembly. This is a simple way of avoiding imbalances in the centrifugal pendulum. Contact surfaces 615, 620 further provide a larger contact surface located further outward than securing ring 235 in a radial direction, allowing higher torque to be transmitted between shaft 20 and pendulum flange 25. In addition, in the case of slip of shaft 20 and of contact surface 615 relative to contact surface 620, respectively, due to peak tensions, wear to the surfaces may be kept on a particularly low level due to the larger surfaces. The embodiment of FIG. 6 further causes the slip process to occur between safety ring 235 and groove 215, allowing the material of groove 215 and securing ring 235 to be selected in accordance with the slip process.

Figure 7:
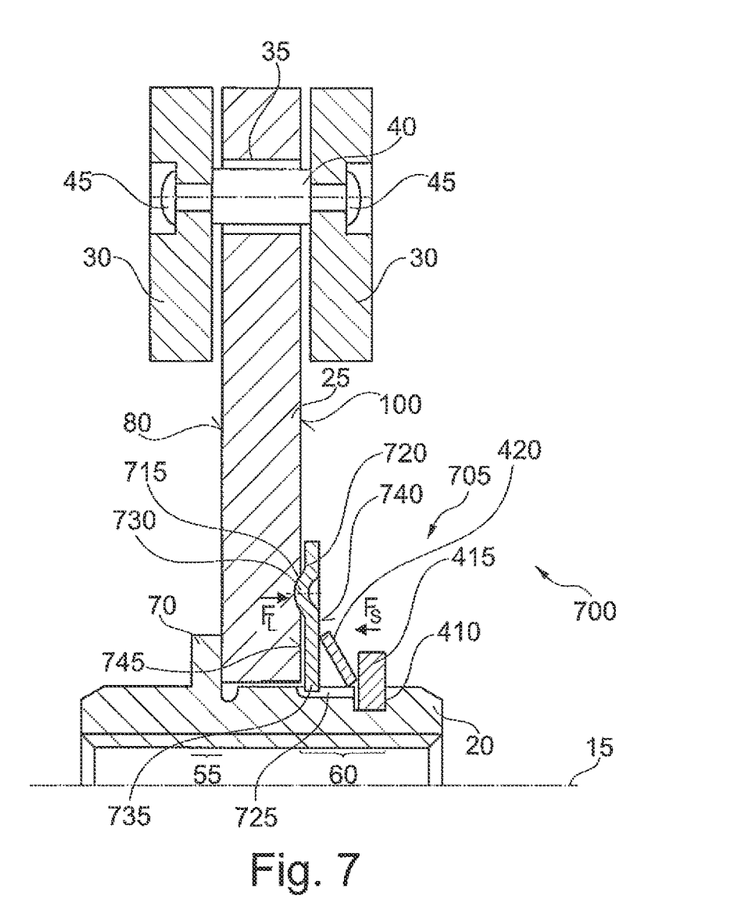
FIG. 7 is a diagrammatic sectional view of a seventh example embodiment of a centrifugal pendulum.
Figure 8:
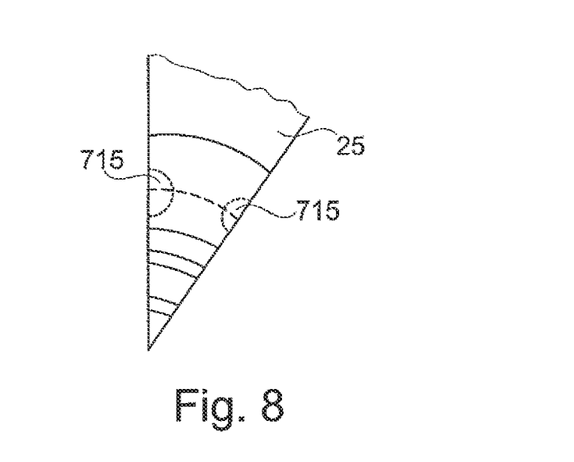
FIG. 8 is a side view of a section of the centrifugal pendulum shown in FIG. 7.

FIG. 7 is a diagrammatic sectional view of a seventh embodiment of centrifugal pendulum 700 and FIG. 8 is a side view of a section of the centrifugal pendulum shown in FIG. 7. In a radially outward direction starting from pendulum flange 25, centrifugal pendulum 700 is embodied to be identical with the centrifugal pendulums shown in the previous figures.

Pendulum flange 25 is connected to shaft 20 in a non-positive way so as to be fixed against relative rotation by means of fastening means 705. Fastening section 55 is embodied to be identical with the fastening means shown in FIG. 1. Fastening means 705 is of similar design as the embodiment of the fastening means shown in FIG. 4. In addition to disc-like spring element 420, this embodiment is further provided with pawl device 710, which comprises at least recess 715 in pendulum flange 25, pawl element 720, and an exterior toothing 725 on shaft 20. Recess 715 has a circular cross section. It is to be understood, however, that other cross sections, in particular groove-like recesses 715 or recesses 715 that extend in a radially outward direction are conceivable. Recess 715 may be embodied as a groove or ribbing. In the illustrated embodiment, multiple circumferential recesses 715 that are equidistantly spaced apart are provided in pendulum flange 25. It is to be understood that the distances between from recess 715 to recess 715 may vary.

Pawl element 720 is disc-shaped and includes pawl bulge 730 that engages in recess 715. In terms of their arrangement, design, and number, pawl bulges 730 advantageously correspond to recesses 715. It is to be understood that the number of pawl bulges 730 may be different from the number of recesses 715. Radially to the inside, pawl element 720 comprises an interior toothing 735 meshing with outer toothing 725 of shaft 20 to allow pawl element 720 to be disposed on shaft 20 so as to be movable on the shaft in an axial direction relative to the shaft and to provide a positive transmission of torque between shaft 20 and pawl element 720. In the illustrated embodiment, pawl element 720 is aligned relative to the pendulum flange in such a way that a respective pawl bulge 730 engages in a respective recess 715 on the pendulum flange. Torque introduced into pawl element 720 is transmitted via pawl bulge 730 into recess 715 in pendulum flange 25. Torque may likewise be transmitted from pendulum flange 25 in an opposite direction of the path described above. As a result, pendulum flange 25 is positively connected to shaft 20 as the rotation element. An advantage of the positive or form-fitting connection described above is that it is easy to release by an axial displacement of pawl element 720 relative to pendulum flange 25.

A pawl element back side 740 facing away from pendulum flange 25 is in contact with spring element 420, which presses pawl element 720 onto end face 100 of pendulum flange 25. Pawl element contact surface 745 facing end face 100 of pendulum flange 25 is in contact with end face 100. Due to the contacting pressure, an axial displacement of pawl element 720 relative to pendulum flange 25 is avoided, ensuring that pawl bulges 730 reliably engage in recesses 715. As described with reference to FIGS. 4 and 5, spring element 420 secures pawls element 720 between securing ring 415 and pendulum flange 25 in such a way that the fluctuating torque may be transmitted between shaft 20 and pendulum flange 25 via protrusion 70 and end face 80 of pendulum flange 25 as well as via groove 420, securing ring 415, spring element 420, pawl element 720, and end face 100. As a result, a non-positive transmission of torque occurs between pendulum flange 25 and shaft 20 via the securing of the pendulum flange to protrusion 70 and via pawl element 720, spring element 420, and securing ring 415 in addition to the positive transmission of torque. This allows the transmission of higher torque between pendulum flange 25 and shaft 20.

If peak torques that are higher than the maximum torque transmittable via fastening means 705 are introduced into shaft 20, the peak torques are absorbed by a slipping or rotation of shaft 20 relative to pendulum flange 25 and are not introduced into centrifugal pendulum 700. To allow shaft 20 to slip relative to the pendulum flange, recess 715 is contoured in such a way that the torque transmitted via recess 715 and the pawl bulge results in release force $F_L$ that counteracts tensioning force $F_S$, pushing pawl element 720 in the direction of securing ring 415. If release force $F_L$ is greater than tensioning force $F_S$, pawl bulges 730 are pushed out of recesses 715 and pawl element 720 is displaced in the direction of securing ring 415. Shaft 20 rotates pawl element 720 relative to pendulum flange 25 until the torque introduced into shaft 20 is lower than the transmittable torque. As long as release force $F_L$ is greater than tensioning force $F_S$, shaft 20 continues to be rotated relative to pendulum flange 25 even if further recess 715 is located opposite pawl bulge 730. In this case, pawl bulge 730 will engage in the further recess 715 but will also be immediately released from the latter in the way described above. If the torque in shaft 20 drops below the maximum transmittable torque, shaft 20 is rotated relative to pendulum flange 25 until pawl bulge 730 is located opposite recess 715 and pawl element 720 is again pressed against pendulum flange 25 and pawl bulge 730 is pressed into recess 715 due to tensioning force $F_S$.

An advantage of this embodiment over the embodiments shown in FIGS. 1 to 6 is that it allows a higher torque to be transmitted between pendulum flange 25 and shaft 20 by means of fastening means 705. This is advantageous in particular for high-torque Diesel engines. At the same time, any impact of the pendulum masses and spacer bolt 40, respectively, in section 35 may be avoided.

It is to be understood that the embodiments shown in FIGS. 1 to 7 may be combined with one another in any desired way. The essential aspect is that the transmission of torque between pendulum flange 25 and rotation element 20 is at least partly implemented in a non-positive way and a rotation of pendulum flange 25 relative to the rotation element is possible when the maximum torque transmittable by fastening means 50, 205, 305, 405, 505, 605, 705 is exceeded.

LIST OF REFERENCE SYMBOLS 10 centrifugal pendulum (embodiment)
15 axis of rotation
20 shaft (rotation element)
25 pendulum mass
30 pendulum mass
35 section
40 spacer bolt
45 rivet head
50 fastening means
55 fastening section
60 fastening section
61 intermediate section
65 tensioning means
70 protrusion
75 contact surface
80 end face
85 groove
86 side surface
90 securing ring
85 contact surface
100 end face
105 incline
110 incline
111 side surface
200 centrifugal pendulum (second embodiment)
205 fastening means
210 groove
215 groove
220 groove surface
225 groove surface
230 securing ring
235 securing ring
240 incline
245 groove edge
250 contact surface
255 contact surface
256 contact surface
260 groove surface
265 groove surface
300 centrifugal pendulum (third embodiment)
305 fastening means
310 incline
400 centrifugal pendulum (fourth embodiment)
405 fastening means
410 groove
415 securing ring
420 spring element
500 centrifugal pendulum (fifth embodiment)
505 fastening means
510 spring element 600 centrifugal pendulum (sixth embodiment)
605 fastening means
700 centrifugal pendulum (seventh embodiment)
705 fastening means
710 pawl device
715 recess
720 pawl element
725 exterior toothing
730 pawl bulge
735 interior toothing
740 back side
745 contact surface
d axial extension of intermediate section
b axial extension of the pendulum flange
$d_2$ interior diameter of the groove
$b_N$ width of the groove
$b_S$ width of the securing ring

What is claimed is:

1. A centrifugal pendulum, comprising:
a rotation element including:
a protrusion; and,
a circumferential groove axially spaced apart from the protrusion along an axis of rotation about which the rotation element is rotatable, the circumferential groove having a first incline side surface; and,
a pendulum flange including a first end face and a second end face, the pendulum flange connected to the rotation element only with a fastener arranged to at least partially engage the circumferential groove, wherein the fastener includes a first fastening section disposed on the rotation element and contacting the first end face of the pendulum flange and a second fastening section disposed on the rotation element and spaced apart axially opposite from the first fastening section along an axis of rotation of the rotation element, wherein the second fastening section contacts the second end face of the pendulum flange, wherein the second end face is disposed axially opposite the first end face.

2. The centrifugal pendulum as recited in claim 1, wherein the fastener comprises a tensioner axially arranged between the first incline side surface and the second end face, the tensioner operatively arranged to force the pendulum flange toward the protrusion in a first axial direction.

3. The centrifugal pendulum as recited in claim 2, wherein:
the protrusion has a first contact surface facing the first end face, the first end face abuts against the first contact surface; and,
the tensioner is operatively arranged to clamp the pendulum flange against the first contact surface.

4. The centrifugal pendulum as recited in claim 3, wherein the tensioner is a securing ring.

5. The centrifugal pendulum as recited in claim 4, wherein the securing ring comprises a second incline side surface arranged to engage the first incline side surface.

6. The centrifugal pendulum as recited in claim 1, wherein the rotation element comprises an intermediate section disposed between the protrusion and the circumferential groove, and a radial space exists between a radially inward facing surface of the pendulum flange and the intermediate section.

7. A centrifugal pendulum, comprising:
a rotation element; and
a pendulum flange connected to the rotation element utilizing a fastener configured to transmit torque between the rotation element and the pendulum flange and that allows transmission of torque between the pendulum flange and the rotation element to at least partly be achieved by a connection configured to allow slip to occur between the pendulum flange and rotation element when torque exceeds a threshold, wherein the fastener includes a first fastening section disposed on the rotation element and contacting a first end face of the pendulum flange and a second fastening section disposed on the rotation element and spaced apart axially opposite from the first fastening section along an axis of rotation of the rotation element, wherein the second fastening section contacts a second end face of the pendulum flange, wherein the second end face is disposed axially opposite the first end face.

8. The centrifugal pendulum of claim 7, wherein the centrifugal pendulum further includes a securing ring disposed between the second fastening section, and wherein the securing ring is configured to press the pendulum flange in a direction towards a protrusion of the first fastening section.

9. The centrifugal pendulum of claim 8, wherein the securing ring includes an inclined surface that is oriented at an angle relative to an axis of rotation of the centrifugal pendulum.

10. The centrifugal pendulum of claim 9, wherein the first fastening section includes a protrusion, and the second fastening section includes a groove.

11. The centrifugal pendulum of claim 10, wherein the securing ring includes a securing ring diameter that is smaller than an interior diameter of the groove.

12. The centrifugal pendulum of claim 7, wherein the connection is a force-locking connection.

13. The centrifugal pendulum of claim 7, wherein the pendulum flange circumferentially surrounds the rotation element.

14. The centrifugal pendulum of claim 7, wherein the fastener further includes an intermediate section with a length corresponding to an axial extension of the pendulum flange, wherein the intermediate section is surrounded by the pendulum flange in a circumferential direction.

15. The centrifugal pendulum of claim 14, wherein the first fastening section includes a protrusion having a protrusion diameter greater than a diameter of a shaft in the intermediate section.

16. The centrifugal pendulum of claim 7, wherein the rotation element includes an interior toothing for connecting a shaft to components of a drive train.

17. A centrifugal pendulum, comprising:
a shaft configured to rotate;
a pendulum flange circumferentially surrounding the shaft and connected to the shaft utilizing a fastener configured to transmit torque between the shaft and the pendulum flange, wherein the fastener includes a first fastening section disposed on the shaft and contacting a first end face of the pendulum flange and a second fastening section disposed on the shaft and spaced apart axially opposite from the first fastening section along an axis of rotation of the shaft, wherein the second fastening section contacts a second end face of the pendulum flange, wherein the second end face is disposed axially opposite the first end face; and
a tensioner located in the second fastening section that includes a securing ring configured to engage in a groove of the second fastening section and press the pendulum flange against the first fastening section.

* * * * *